United States Patent

[11] 3,612,979

| | | |
|---|---|---|
| [72] | Inventor | Wilfred Roth |
| | | Burlington, Vt. |
| [21] | Appl. No. | 782,913 |
| [22] | Filed | Dec. 10, 1968 |
| [45] | Patented | Oct. 12, 1971 |
| [73] | Assignee | Dual-Lite Company |
| | | Newton, Conn. |

[54] SYSTEM FOR MEASURING TRANSFER OF ELECTRIC CHARGE
12 Claims, 3 Drawing Figs.

[52] U.S. Cl.................................................. 320/39,
 250/206, 307/130, 320/11, 320/47
[51] Int. Cl........................................................ H02j 7/04
[50] Field of Search......................................... 250/200–205,
 206; 307/130; 320/2, 21–23, 11, 30,
 39, 43, 47; 340/190, 199

[56] References Cited
UNITED STATES PATENTS

| | | | |
|---|---|---|---|
| 1,227,149 | 5/1917 | Jacobson................... | 320/21 |
| 2,540,174 | 2/1951 | Riley, Jr. et al........... | 320/22 X |
| 2,640,967 | 6/1953 | MacGeorge................ | 340/199 |
| 2,903,678 | 9/1959 | Wills......................... | 340/199 X |
| 3,068,408 | 12/1962 | Lovegrove................. | 323/21 X |
| 3,181,055 | 4/1965 | Bischof..................... | 340/199 |
| 3,329,882 | 7/1967 | Sobel........................ | 320/DIG. 1 |
| 3,381,212 | 4/1968 | Peltola et al.............. | 323/21 |

*Primary Examiner*—William M. Shoop, Jr.
*Attorney*—March, Gillette & Wyatt

ABSTRACT: A movable piston, or float, including a permanent magnet is driven from one end of a closed, liquid-filled tube to the other by the magnetic field of a coil wound around the tube and energized by current flowing in one direction or the other according to the transfer of an electric charge into or out of a charge-accumulating or charge-producing element, such as a storage battery. A light bulb adjacent the tube directs light through the tube to a photocell. The transfer of a predetermined quantity of charge in one direction causes the piston to move to one end of the tube and interfere with passage of light through the tube. Transfer or charge in the opposite direction causes the piston to move out of the light path. The photocell may be used to control a circuit connected to maintain a charge on a storage battery by replenishing any dissipated charge at a relatively high rate and thereafter maintain the battery in a fully charged condition by a trickle charge. Establishment of the high charge rate in the system occurs when the piston has been moved out of the light path by transfer of charge away from the fully charged battery. The charge rate drops to a trickle charge value when the piston moves back to interrupt the light path, indicating that the battery is substantially fully charged.

PATENTED OCT 12 1971 3,612,979

INVENTOR.
WILFRED ROTH
BY
MARCH, GILLETTE & WYATT
ATTORNEYS

SYSTEM FOR MEASURING TRANSFER OF ELECTRIC CHARGE

This invention relates to apparatus for responding to the transfer of electric charge, and particularly to apparatus for determining the transfer of charge to and from a storage battery and for controlling the charging circuit to provide either a trickle charge or a relatively fast charge, depending upon whether the battery is substantially fully charged or not.

In accordance with the present invention, a charge integrator is provided which comprises a closed tube containing a fluid and a magnet which may be either a permanent magnet or an electromagnet, arranged in a piston to move within the fluid. The tube is substantially horizontal during operation and a coil wound around the tube provides a magnetic field which interacts with the field of the magnet to move the magnet toward one end or the other of the tube, depending upon whether current is flowing in one direction or the other through the coil. For operation in conjunction with a storage battery, the coil may be connected so that the current flows in one direction when the battery is being discharged and in the other direction when the battery is being charged. Means are provided to indicate when the magnet reaches one end of the tube, and in particular such means may include a light on one side of the tube and a photosensitive device on the other to be activated by the light except when the magnet interrupts the light path through the tube. The coil and magnet are so related that the force on the magnet is constant for constant current within certain limits of travel of the magnet, and the force is directly proportional to the value of current.

A principal object of the invention is to provide a device actuated by the charge transferred to or from a charge source. An additional object is to provide a system for charging a battery at a relatively high rate to replace lost charge by an equal or greater amount of charge in order to return the battery to its fully charged state as quickly as possible and then to keep supplying charge at a trickle rate.

Other objects will become apparent in the following specification, together with the drawings, in which.

In order to simplify the description of the charge transfer measuring system of this invention, it will be described with reference to a battery charging circuit, but the invention is not to be considered limited to this use.

Figure 1:
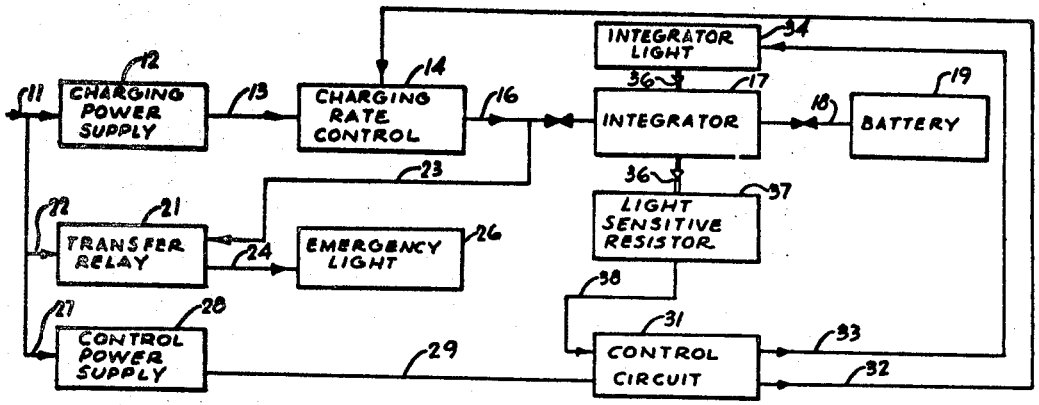
FIG. 1 is a block diagram of the battery charging system of the present invention.

The battery-charging system of FIG. 1 is connected to a source of power through a supply line 11. Normally this source of power will be 115v. AC, but other voltages may be used as well. The alternating current supply is connected to a charging power supply 12 which changes the alternating current to direct current at the proper voltage level and this direct current is connected by means of a line 13 to a charging rate control 14 and, through a connection 16, to an integrator 17 which in turn is connected by a line 18 to a battery 19 that is to be maintained in charged condition for emergency operation. A transfer relay 21 is also connected by means of a line 22 to the incoming alternating current to be controlled thereby as long as the alternating current is available. The transfer relay is connected by means of a line 23 to the charging rate control 14 and by means of a line 24 to a system of emergency lights 26. Basically, the transfer relay 21 operates to connect the emergency light 26 to the battery 19 when there is loss of alternating current to the input line 11.

Also connected to the input line 11 by means of a branch line 27 is a control power supply 28 the output of which is connected by a line 29 to a control circuit 31. One output of the control circuit 31 is connected by a line 32 to the charging rate control 14 to govern the rate at which charging current is supplied to the battery 19 when power is available through the input line 11. Another output of the control circuit 31 is connected through a line 33 to an integrator light 34 to turn this light on when there is power available from the input line 11. Illumination from the integrator light 34 follows a path 36 through the integrator to a detector 37 in the form of a light-sensitive resistor which is connected by a line 38 to govern the control circuit 31.

Figure 2:
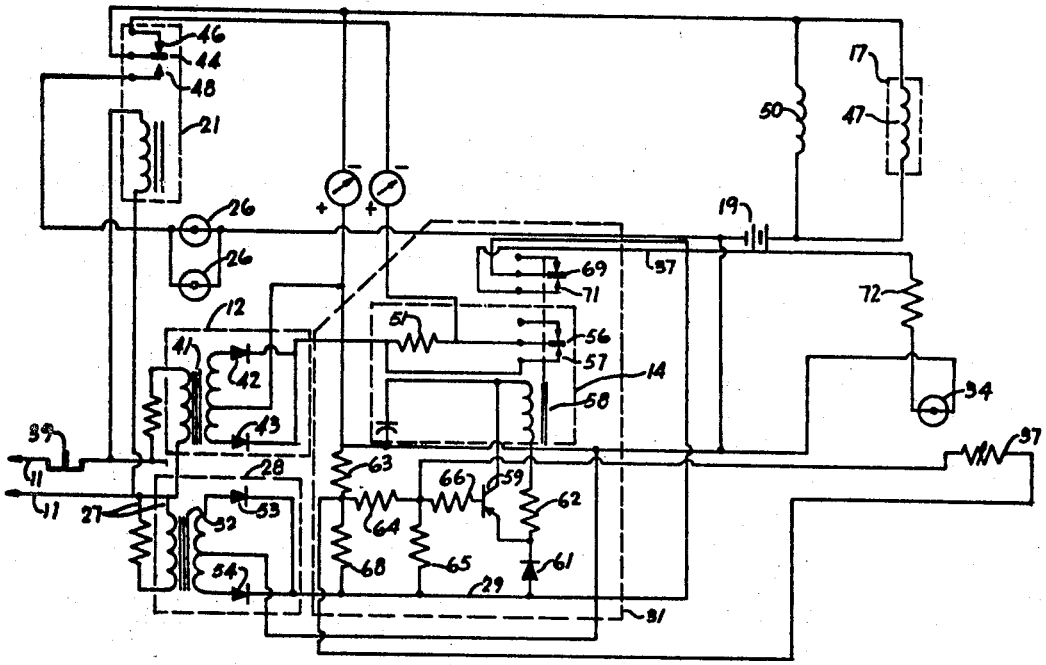
FIG. 2 is a schematic circuit diagram of the system of FIG. 1.

In FIG. 2 the line 11 is shown as a normal two-wire line connected through a master switch 39 to the primary of a transformer 41 which is one of the components of the charging power supply 12. The secondary of the transformer 41 is connected to a pair of diodes 42 and 43 to rectify the alternating current to provide the necessary direct current for charging the battery 19.

The transfer relay 21 has an armature 44 connected to a coil 47 of the integrator 17 and a fixed contact 48 connected to the emergency lights 26. When there is no alternating current available from the input line 11, the armature 44 will contact the fixed contact 48 to close the emergency light circuit.

The transfer relay also has a fixed contact 46 connected through a resistor 51 to the charging power supply 12 to transmit a charging current to the battery 19. When the resistor 51 is not short circuited only a small current will flow through it to provide a trickle charge to the battery 19.

The control power supply 28 comprises a transformer 52 and diodes 53 and 54 to rectify the output of the transformer. The primary winding of the transformer is connected by a line 27 to the input line 11.

The charging control circuit has the basic purpose of determining whether the resistor 51 should be short circuited or not. Short circuiting of the resistor is accomplished by means of an armature 56 and a fixed contact 57 of a relay 58. The relay in turn is connected as the collector load of a transistor 59, the conductivity of which is determined by a biasing circuit comprising a diode 61 in series with a resistor 62 to determine the emitter voltage, a resistor network comprising resistors 63–66, a thermistor 68 and the light-sensitive resistor 37. The relay 58 has a second armature 69 that cooperates with a fixed contact 71 in series with an integrator light 34, and if necessary, a resistor 72. The relay 58 is so connected that the circuit for the light 34 is closed only when there is input power via the line 11.

Figure 3:
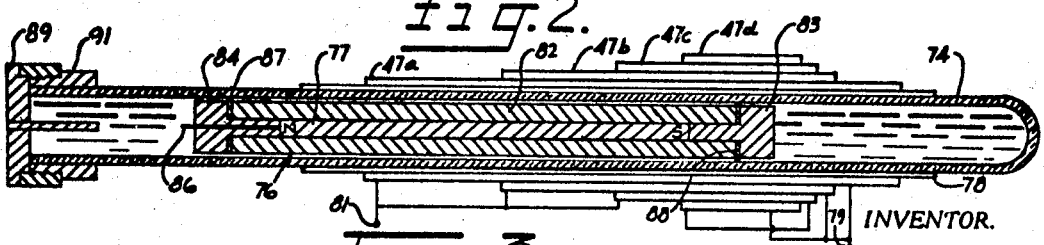
FIG. 3 illustrates one form of integrator for use in the system of FIG. 1.

The integrator shown in FIG. 3 comprises a tube 74 that is transparent or at least has a transparent section through which a light beam can pass. The tube is filled with a fluid having the proper viscosity, such as silicone oil or grease, over the range of temperature likely to be encountered in use. A float, or piston, 76 having a magnet 77 embedded therein is free to move back and forth in the tube 74 in response to the net magnetic field generated by load current flowing in the coil 47 around the tube. The force applied to the piston 76 by the magnetic field is directly proportional to load current through the coil, and the velocity of the piston is proportional to this force if the viscosity of the fluid remains constant. Thus the motion of the piston 76 is the true time integral of current and the piston travels a distance that is proportional to charge flowing in or out of the battery.

The coil 47 is made up of four separate windings 47a–47d so related to each other as to produce the proper field distribution to maintain constant force on the piston 76 for constant current independent of the position of the piston in the tube. One embodiment that has been found to work quite well comprises a winding 47a having 58 to 60 turns of 014 wire in a winding about 4 inches long on a form 78 having an outer diameter of about three-fourth inch. The second winding 47b has 44 to 46 turns of 016 wire extending over a length of about 2½ inches, the right-hand end of which is about one-half inch from the right-hand end of the winding 47a. The third winding 47c is wound on the second winding 47b and consists of about 25 to 26 turns of 016 wire with a coil length of 1½ inches with the right-hand end starting about one-eighth inch from the right-hand end of the winding 47b. The fourth winding 47d is wound on the third winding and consists of about 15 to 16 turns of 016 wire with a coil length of about (seven-eighth inch and with its right-hand end displaced about one-eighth inch from the right-hand end of the coil 47c. The four coil sections are wound in the same direction, and the right-hand ends of coils 47a and 47b are directly connected together to a terminal 79. The left-hand ends of coils 47a and 47b as well as the left-hand end of the coil 47c are connected to a second terminal 81. The right-hand end of coil 47c is connected to the left-hand end of coil 47d and the right-hand end of the latter is connected to the terminal 79, which places the coils 47c and 47d in series with each other but with the field coil 47d partly opposing the field of coil 47c.

The piston 76 includes a hollow wooden cylinder 82 which may be of light weight wood, such as balsa, closed at each end by balsa wood plugs 83 and 84. The plug 84 has a center pin 86 that limits the movement of the piston in one direction, and two Teflon spacers 87 and 88 are held in place between the hollow member 82 and the plugs 83 and 84. These Teflon members are included to keep the piston axially aligned in the tube and may be formed somewhat in the shape of equilateral triangles so that only three points can engage the inner walls of the tube 74 to reduce the friction as much as possible. The end of the tube 74 through which the fluid and the piston 76 are inserted is closed by a brass cap 89 threaded onto a brass collar 91 cemented to the tube 74.

The operation of this system will be described starting with the battery 19 fully charged and the normal input over the line 11 present. In this condition, input power via the line 11 supplies a trickle charge through the charging power supply 12, the charging rate control 14 and the integrator 17 to keep the battery fully charged. At the same time a small amount of power keeps the transfer relay 21 energized and, through the control power supply 28, keeps the control circuit 31 in an idling condition.

When power failure occurs, trickle charging current can no longer flow through this path. The transfer relay then allows the battery 19 to discharge through the integrator 17 and the transfer relay 21 into the emergency light circuit 26. The control circuit 31 is inoperative since it derives its operating power from the incoming alternating current through the line 11. The battery current, discharging through the integrator 17, causes its piston 76 to move away from the light path 36 and toward the other end of the tube 74 as the charge stored in the battery flows through the load. However, at this time the light 34 is not on since it derives its operating power ultimately from the line 11 rather than the battery 19. The distance that the piston 76 moves is proportional to the product of the time of the emergency and the amount of current being used. This may be stopped by power restoration at any time before the battery 19 is completely discharged or it may, in unusual circumstances, continue until the battery 19 is completely discharged. The position of the piston 76 will be a direct measure of the amount of charge that has been removed from the battery.

When power is restored to the line 11, the power supplies 12 and 28 are energized, and the control circuit 31 is in a condition to call for a trickle charge through the charging rate control 14. Restoration of incoming power also causes the charge power supply 12 to deliver the trickle charge and the transfer relay 21 to disconnect the emergency light system 26 from the battery 19 and instead to connect the battery to receive a new charge. The control circuit 31 energized by the now operating control power supply 28 actuates the relay 58 to turn on the integrator light 34 and to short circuit the resistor 51 to change the charge rate from a trickle charge to a high charge.

If the power failure has been sufficiently long and if the amount of charge removed from the battery has been sufficiently great, the integrator piston 76 will be out of the light path 36. This will cause the light-sensitive resistor 37 to change its resistance to signal the control circuit 31 to maintain the charging rate at its high level. A short stabilization time is required for the control circuit 31 to determine whether the high charge rate should be continued; if there has been a substantial discharge, the control circuit will hold the charging rate control 14 in a high level by maintaining the resistor 51 short circuited.

The charge current to the integrator coil 47 is in the reverse direction from the previous discharge current and produces a magnetic field in the opposite direction from that produced by the discharge current. This causes the piston 76 to begin to retrace its path, the distance it moves by a direct measure of the amount of charge returned to the battery 19. As the charge is returned to the battery and the charging rate gradually reduces, the piston moves more slowly. The light path through the tube 74 is not interrupted until the piston 76 has returned to its starting position, thus metering the replacement of the amount of charge which was previously removed from the battery 19.

When the light beam is finally interrupted, the light-sensitive resistor 37 returns to its dark-resistance level. This affects the bias on the transistor 59 and causes the control circuit 31 to reenergize the relay 58 and remove the short circuit across the resistor 51, thereby returning the charge rate to a trickle charge level. It is unnecessary for the integrator light 34 to remain on, and therefore the operation of the relay 58 also turns off this light. The control circuit 31 remains in an idling condition to be ready distinguish between a momentary power interruption, such as a test, and an extended power failure. If the momentary interruption is less than about 15 to 30 seconds, no high charge will be required and the charging rate control 14 will remain in the trickle charge condition.

Since the control circuit 31 receives its information about the battery 19 only in the form of how much charge has been removed from it during its most recent discharge and is not dependent on the battery voltage, it can be used with different battery voltage systems and with different kinds of batteries. Batteries may be only partly discharged or they may have been completely discharged, and the control circuit 31 responds only to the amount of charge that has passed through the integrator 17 during the discharge period.

This metering system requires no temperature compensation within the limits of normal usage. While there may be some change in the viscosity of the fluid tube 74 and therefore some change in the rate of motion of the float 76, this will produce only a negligible error in the practical operation of the system, and even this error can be further reduced by providing heat insulation for the tube. The charging circuits and control circuits may be operated with higher capacity systems by providing suitable current shunts around the integrator coil 47 so as to allow a single design to accommodate a wide range of charge and discharge capacities.

What is claimed is:

1. In an electrical system in which an electric charge passes from one portion of said system to another portion, apparatus comprising: a magnet element; a coil element connectable to said system whereby said charge passes from said one portion to said other portion through said coil to produce a magnetic field that interacts with the field of said magnet; a container having a fluid of predetermined viscosity therein, one of said elements being movably supported in said fluid to move in response to the interaction of the field of said coil and the field of said magnet at a velocity proportional to the time derivation of said charge; and means responsive to the relative positions of said magnet and said coil to regulate the transfer of said electric charge.

2. The invention as defined in claim 1 in which said means responsive to the position of said magnet comprises: a light source directing light along an optical path intersecting the path of movement of one of said relatively movable elements; and a light detector to produce an electrical change corresponding to the change in light traveling along said optical path in response to the movement of said one of said elements.

3. The invention as defined in claim 1 in which said magnet comprises a permanent magnet.

4. The invention as defined in claim 1 in which said magnet is movable and said coil is fixed.

5. The invention as defined in claim 1 in which said apparatus comprises, in addition, a closed cylindrical container; and said magnet is longitudinally movable in said container.

6. The invention as defined in claim 5 in which said coil surrounds a portion of said cylinder.

7. The invention as defined in claim 6 comprising, in addition: float means supporting said magnet in said fluid, said float and said magnet comprising a floating system.

8. The invention as defined in claim 7 in which said cylinder has a transparent portion through which said optical path passes, and said floating system comprises an opaque member movable across said transparent portion to close off said optical path when said floating system moves in one direction in said cylinder in response to the interaction of the field of said magnet and the field of said coil.

9. Battery charging apparatus comprising an integrator connected to said battery; a light source; light-detecting means; a magnetically controlled and movable piston member located in the path of light from said source to said detecting means and positionable according to the charge of said battery; a source of charging current for said battery; a charging rate control circuit connecting said source of charging current to said light-detecting means to be controlled thereby and connected to said charging rate control to control the operation thereof to cause said battery to be charged at a relatively high rate when it has been discharged below a predetermined level and to be charged at a relatively low rate when it is charged above said level.

10. The battery charging apparatus of claim 9 in which said integrator comprises a tube substantially filled with transparent silicone liquid and having a light path transversely through said tube; a float in said tube; a permanent magnet in said float, said float comprising said movable member; a coil around said tube and connected to said battery to be energized by the current through said battery to move said float in one direction or the other in accordance with the direction of flow of said current, said light source being on one side of said tube and said light-detecting means being on the other side of said tube.

11. The battery charging apparatus of claim 9 in which said light-detecting means comprises a light-sensitive resistor and an amplifier circuit connected thereto to be controlled thereby and said charging rate control comprises a relay and a resistor connected to terminals of said relay, said relay being connected to said amplifier to be controlled thereby.

12. The battery charging apparatus of claim 9 comprising, in addition: a transfer relay provided with input terminals to receive operating current from an external power source and comprising an armature, a normally closed contact, and a normally open contact, said armature and said normally closed contact being connected in series with said battery and said integrator; and an emergency lighting circuit connected in series with said battery and said armature and said normally closed contact of said relay to be energized when said relay is not energized.